United States Patent [19]

Scourtelis

[11] Patent Number: 4,864,794
[45] Date of Patent: Sep. 12, 1989

[54] ELEMENTS FOR A MODULAR SYSTEM FOR THE ASSEMBLY OF FURNITURE, CONTAINERS, PARTITIONS OR THE LIKE

[75] Inventor: Nicolas Scourtelis, Athens, Greece

[73] Assignee: Mamouth Comix Ltd., Athens, Greece

[21] Appl. No.: 192,553

[22] Filed: May 11, 1988

[30] Foreign Application Priority Data

May 14, 1987 [DE] Fed. Rep. of Germany ... 8706941[U]

[51] Int. Cl.⁴ .............................................. E04C 1/10
[52] U.S. Cl. ..................................................... 52/582
[58] Field of Search ......................... 52/582, 584, 587; 108/64; 297/248

[56] References Cited

U.S. PATENT DOCUMENTS 1,433,219  10/1922  Newell ................................... 52/587
1,863,734   6/1932  Venzie ................................... 52/587
4,080,765   3/1978  Fasano .................................. 52/587

Primary Examiner—James L. Ridgill, Jr.
Attorney, Agent, or Firm—Lane and Aitken

[57] ABSTRACT

Elements for a modular system for the assembling of furniture, containers, partitions or the like, that consists of polygonal panels and bracing elements for a flat or spatial connection of single panels. Each of the panel elements (10) has several cut-out sections (12) in its borders (11). In each of the cut-out sections (12) there is inserted a rod (13) running essentially in the same direction as the border. Each of the bracing elements has the shape of a clamp (20) which can be inserted into the cut-out sections of adjoining panel elements (10) and whose rods (13) are shaped for gripping, preferably to establish a drop-in connection (FIG. 1).

9 Claims, 2 Drawing Sheets

ELEMENTS FOR A MODULAR SYSTEM FOR THE ASSEMBLY OF FURNITURE, CONTAINERS, PARTITIONS OR THE LIKE

SUMMARY OF THE INVENTION

The invention corresponds to an element of a modular system for the assembly of furniture, containers, partitions or the like, that consists of polygonal panels and bracing elements for a flat or spatial connection of single panels.

The invention deals with the problem of assembling furniture, containers, partitions and the like with single panels in such a manner that not only flat but also spatial structures can be created with relatively simple means.

The panels according to the invention are preferably of rectangular or square shape, when seen from a plan view. They consist of a border surrounding the edges, with cut-out sections at certain points. In the thus formed clearances there is a rod, which is essentially inserted in the geometrical middle of said clearances. The bracing element according to the invention is in the shape of a clamp that can embrace two adjacent rods in such a manner that, by means of the bracing element, both parts are firmly secured in a determined spatial position. The size of the cut-out sections is chosen in such manner that several such clamps can be inserted next to each other so that at one point of connection more than two panels, e.g. three or even four panels, can be secured in an angular relation to each other.

The clamp according to the invention can possess elastic properties so that it can be slipped over the rods tightly enough that they cannot be easily separated from each other.

Both the panels and the clamps can be made out of plastic, but other materials are also adequate.

The panels can be open on their insides and they can be designed in such a way that the openings can be closed in a non-permanent manner with the aid of appropriate components.

The system according to the invention allows the asembly of box-shaped hollow bodies, such as, e.g., tables with open side panels.

Furthermore, it is also possible to build shelves and partitions or exhibition booths in an appropriate manner.

In accordance with the invention it is possible to easily disassemble the assembled structures so that the elements can be stored and transported without taking up much space.

BRIEF DESCRIPTION OF THE DRAWINGS

By way of example, the invention is explained below with the aid of the drawing.

DETAILED DESCRIPTION OF THE PREFERRED EMBODIMENTS

Figure 1:
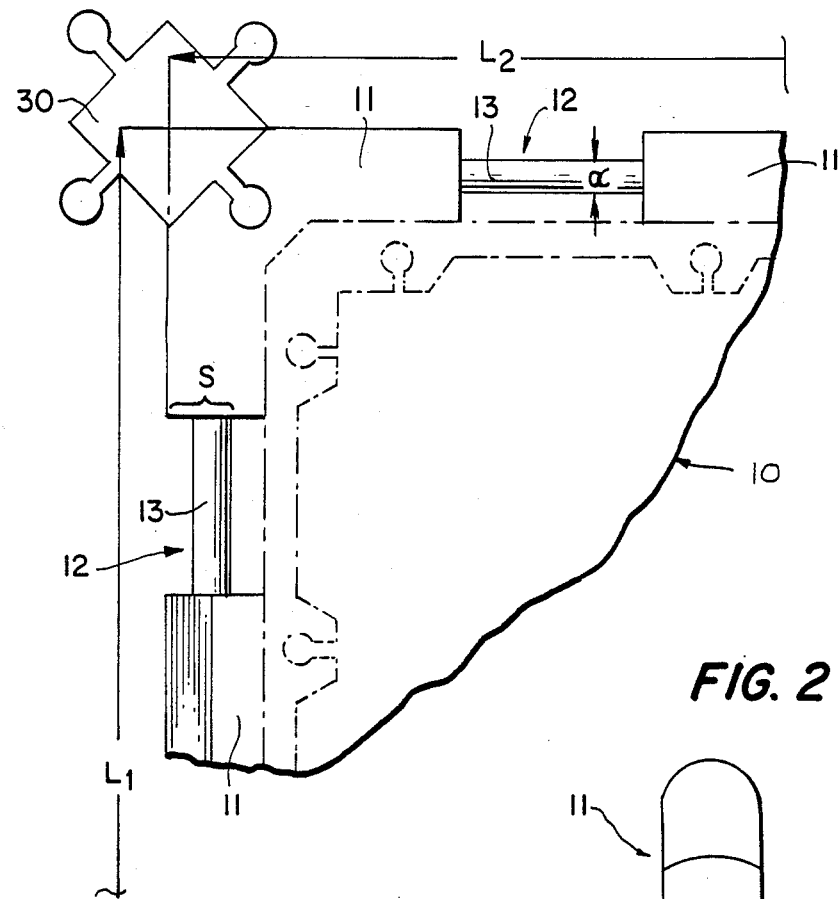
FIG. 1 is a plan view of a part of a panel element.

In the drawing, 10 is a panel-shaped, essentially rectangular element. One lateral length is $L_1$ and the other one is $L_2$ but $L_1$ and $L_2$ can be of the same length.

Figure 2:
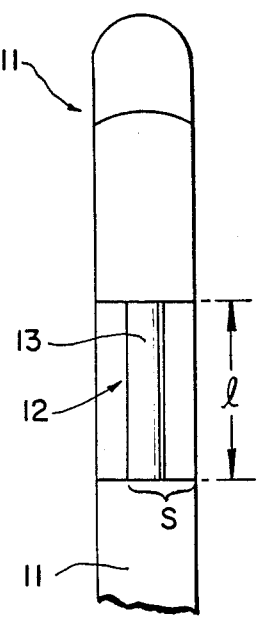
FIG. 2 is a left end view of the panel element of FIG. 1.

In the drawing, 11 are the borders of the panel element 10 which surround the panel elements 10, forming a polygon. The border parts 11 have opposed side surfaces, and, in the preferred specific embodiment, the outer edges of the border parts 11 are rounded off, as can be seen at the top of FIG. 2. At determined distances to each other and to the edge of the panel element 10 there are provided cut-outs or indentations 12 having a length l. In the drawings there can be seen only two of such cut-outs, while the number of the cut-outs required for a practical design depends on the length of the panels and on the desired strength of the connection to be obtained.

In the center of the cut-outs 12 there are inserted rods 13 having a preferably round cross section with a diameter d.

The rods 13 are arranged in such a manner that there is a predetermined distance s measured from each respective opposed side surface of the associated border part 11 to the side of the rod 13 opposite the side surface as can be seen in FIGS. 1 and 2.

Figure 3:
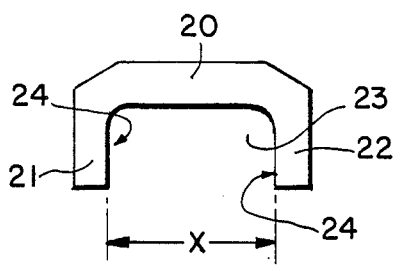
FIG. 3 shows a front view of a bracing element for the panel element of FIG. 1.

FIG. 3 shows a clamp 20 as a bracing element. The clamp 20 shows two fork-like projections or legs 21 and 22 that are at a distance x from each other, as shown in FIG. 3. The thus formed inside space 23 is of such size that it can accommodate two rods 13 arranged next to each other in two adjacent cut-out sections 12. The projections 21 and 22 can be provided with gripping elements 24 in order to ensure a clamping or locking fastening. It is also possible to design the distance x somewhat smaller than two s so that there is formed a compression joint.

The clamps 20 have a depth (as viewed in FIG. 3) that is one half of the length l, one third of the length l or the like. Thus, several clamps 20 can be placed into a cut-out section 12.

FIG. 1 shows fasteners on the inside of the panel-shaped element 10, which could be used to fasten a plate to the panel 10, so as to cover the opening formed by the borders 11.

Furthermore, FIG. 1 also shows in the left upper part a cut-out section in the corner of the border element 11 which is intended for more fasteners. A fitting piece 30 has four projections that fit into the corresponding cut-out sections of adjacent panels 10 in order to ensure a firm connection of the panels.

Figure 4:
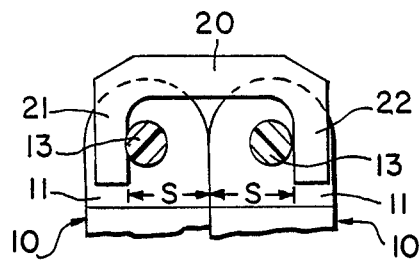
FIG. 4 is a fragmentary cross-section of two panel elements secured by a clamp.
Figure 5:
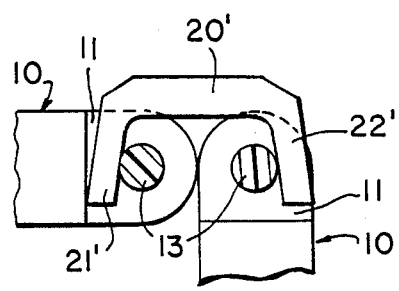
FIG. 5 is a fragmentary cross-section of two panel elements connected in a spatial arrangement with a clamp.
Figure 6:
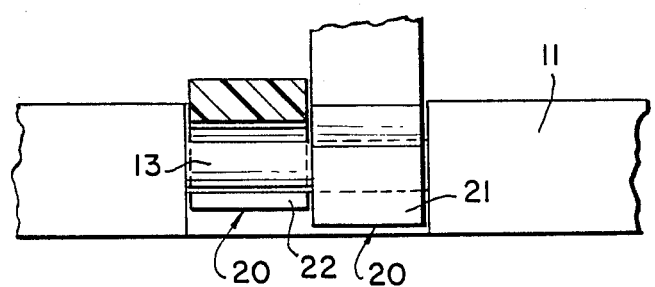
FIG. 6 is a fragmentary end view of a panel element showing a plurality of clamps in an indentation.

FIG. 4 shows fragments of the border elements 11 of two adjacent panel elements 10 held together by a clamp 20. Internal surfaces of the legs 21 and 22 of the clamp engage the rods 13. Since the distance x between the internal surfaces of the legs 21 and 22 is equal to two s, which is the distance from one side surface of a border element 11 to the opposite side of the rod 13, the clamp 20 holds the panel elements 10 together with adjacent side surfaces of the border elements engaging one another. A similar connection is shown in FIG. 5, but in that figure, the panel elements 10 are held in a spatial relationship with one another. In this arrangement, a rounded outer surface of one of the border elements 11 of two panel elements 10 engages one of the side surfaces of a border element 11 of the other panel element, since the distance between the rounded outer surface and the rod 11 is also s. However, in this arrangement, a clamp 20' is used, in which the distance between the legs 21' and 22' is somewhat smaller than two s, so there is compression in the joint formed. It is understood that the clamp 20 could also be used in this arrangement. It is further understood that either clamp 20 or clamp 20' could be used to hold panels 10 together in a coplanar relationship. FIG. 6 shows two clamps 20 mounted on a rod 13 in a single indentation in a border element 11 of a panel element so that at one point of connection, three panel elements can be secured in an angular relation to one another. The leg 22 of one of the clamps 20 extends down behind the rod 13, with the connecting portion (shown in cross section) extending forward from the leg 22 for connection to the rod of another panel element. The leg 21 of the other clamp 20 extends down in front of and partially under the rod 13, with the connecting portion extending up and back for connection to the rod of a third panel element.

What is claimed is:

1. A modular system for assembling furniture, containers, partitions and the like in flat and spatial arrangements, comprising:
    a plurality of panel elements, each having a border having a length and defining a plurality of indentations extending through said border transverse to the length of said border;
    a rod in each indentation extending parallel to the length of the border; and
    means attachable by straight line motion to the rods of adjacent panel elements to hold the panel elements to one another, said holding means comprising clamps each having two legs and a portion connecting the legs, each leg having an inside surface facing the inside surface of the other leg, said inside surfaces engaging rods of adjacent panel elements.

2. The modular system according to claim 1, wherein each indentation has a length parallel to the length of the border, each clamp has a depth perpendicular to the legs and the connecting portions of the clamp, and an integral number times the depth of a clamp equals the length of an indentation, whereby a plurality of said clamps can be placed in each indentation.

3. The modular system according to claim 1, wherein each rod has a round cross section.

4. The modular system according to claim 1, wherein the rod has a surface and there is a distance s perpendicular to the length of the border from a side surface of the border to a point on the surface of the rod opposite to said side surface, and a distance x between the internal surfaces of the two legs of a clamp equals 2s, whereby each clamp couples two rods so that the borders of adjacent panels contact one another.

5. The modular system according to claim 1, wherein the rod has a surface and there is a distance s perpendicular to the length of the border from a side surface of the border to a point on the surface of the rod opposite to said side surface, and a distance x between the internal surfaces of the legs of a clamp is sufficiently less than 2s that each clamp couples two rods and, thus, two panel elements, together in a compression joint.

6. The modular system according to claim 1, wherein the internal surfaces of the legs of said clamps have gripping elements.

7. The modular system according to claim 1, wherein said border has side surfaces and a rounded outer surface extending from one side surface to an opposite side surface.

8. The modular system according to claim 7, wherein the distance from one side surface of said border to said rod equals the distance from the opposite side surface of the border to said rod.

9. The modular system according to claim 8, wherein the distance from the rounded outer surface of the border to the rod equals the distance from a side surface of the border to the rod.

* * * * *